United States Patent
Kim et al.

(10) Patent No.: US 9,280,368 B2
(45) Date of Patent: Mar. 8, 2016

(54) FUNCTION EXPANDING METHOD AND MOBILE DEVICE ADAPTED THERETO

(75) Inventors: Taewan Kim, Suwon-si (KR); Hyoungjin Yoo, Suwon-si (KR); Sangheum Cho, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 13/568,571

(22) Filed: Aug. 7, 2012

(65) Prior Publication Data

US 2013/0084843 A1    Apr. 4, 2013

(30) Foreign Application Priority Data

Sep. 29, 2011    (KR) .................. 10-2011-0098925

(51) Int. Cl.
G06F 9/445    (2006.01)
G06F 3/048    (2013.01)
G06F 9/54    (2006.01)

(52) U.S. Cl.
CPC ........ G06F 9/44526 (2013.01); G06F 9/44552 (2013.01)

(58) Field of Classification Search
CPC .................. G06F 9/44526; G06F 9/44552
See application file for complete search history.

(56) References Cited

U.S. PATENT DOCUMENTS

| | | | | |
|---|---|---|---|---|
| 5,903,728 A * | 5/1999 | Semenzato | | 709/217 |
| 2007/0156913 A1 | 7/2007 | Miyamoto et al. | | |
| 2010/0162277 A1 | 6/2010 | Lee et al. | | |
| 2010/0190532 A1* | 7/2010 | Sampat et al. | | 455/569.1 |
| 2011/0022984 A1* | 1/2011 | van der Meulen et al. | ... | 715/830 |
| 2012/0102485 A1* | 4/2012 | Goldman | | 717/176 |
| 2013/0055285 A1* | 2/2013 | Merry et al. | | 719/313 |

OTHER PUBLICATIONS

Embedded Software Labs, "Android multimedia framework introduced OpenCore" (2009), pp. 1-29 [retrieved from www.embeddedsoftwarelabs.com/OpenCore_Architecture_ESL.pdf].*

Li, L., "Android Multimedia Framework Overview" (2010), Wind River, pp. 1-29 [retrieved from http://lists.kde.org/?l=necessitas-devel&m=133612475802867&q=p3].*

Chen, K., "Android 2.3 Introduction", (Dec. 29, 2010), pp. 1-25 [retrieved from [http://www.slideshare.net/kanru/android23intro?related=2&utm_campaign=related&utm_medium=1&utm_source=8#].*

He, J.; He, J., "The research of plug-in extension technology based on Android multimedia player platform", (Jun. 27-29, 2011), 2011 International Conference on Computer Science and Service System (CSSS), pp. 874-877 [retrieved from http://ieeexplore.ieee.org/stamp/stamp.jsp?tp=&arnumber=5974152].*

(Continued)

*Primary Examiner* — Brian W Wathen
(74) *Attorney, Agent, or Firm* — Jefferson IP Law, LLP (57) ABSTRACT

An expanded function supporting method and a mobile device adapted thereto are provided. The method includes receiving input signals for activating a user function related to a system installed to a mobile device, establishing a basic function supporting path used to operate the system when the user function is activated, and an expanded function supporting path to operate an expanded function of the system when an input signal for operating the expanded function is received, and transferring, when receiving an input signal for operating the expanded function, a command for operating the expanded function via the expanded function supporting path.

20 Claims, 5 Drawing Sheets

(56) References Cited

OTHER PUBLICATIONS

Sparks, D., "Google I/O 2009—Mastering the Android Media Framework" (Jun. 2, 2009), Google I/O 2009 Conference [retrieved from http://www.youtube.com/watch?v=-0UmSQeWsJc].*

Freepine, "An overview of Stagefright player" (Jan. 4, 2010), pp. 1 [retrieved from http://freepine.blogspot.com/2010/01/overview-of-stagefrighter-player.html].*

Silva, V., "Pro Android Games" (2009), Apress, Springer-Verlag, pp. 1-298.*

Jipping, M.J., "Smartphone Operating System Concepts with Symbian OS: A Tutorial Guide" (May 29, 2007), Wiley Publishing, pp. 143-145.*

Noble, J.; Weir, C., "Small Memory Software: patterns for systems with limited memory" (2001), Addison-Wesley, Person Education, pp. 108-118.*

Khronos Group, "Khronos API Logo and Word Mark Guidelines" (May 5, 2010), pp. 1-9 [retrieved from https://web.archive.org/web/20100505215206/http://www.khronos.org/legal/trademarks/].*

\* cited by examiner

FUNCTION EXPANDING METHOD AND MOBILE DEVICE ADAPTED THERETO

PRIORITY

This application claims the benefit under 35 U.S.C. §119(a) of a Korean patent application filed on Sep. 29, 2011 in the Korean Intellectual Property Office and assigned Serial No. 10-2011-0098925, the entire disclosure of which is hereby incorporated by reference.

BACKGROUND OF THE INVENTION

1. Field of the Invention

The present invention relates to a method for expanding functions of systems installed to a mobile device. More particularly, the present invention relates to the mobile device adapted to the method.

2. Description of the Related Art

Mobile devices refer to mobile communication devices with a call function. Mobile devices are widely adopted because the mobile devices can be easily carried. Mobile devices are implemented with various types of input modes in order to provide user functions. For example, such input modes include a touch screen with a touch panel and a display unit, so that the users can make gestures on the touch panel while viewing the objects on the display unit. Such mobile devices create touch events according to the user's touches and control the corresponding application programs.

Mobile devices also support a camera function to acquire images or videos. Users can acquire videos via the camera function and transmit the videos via a transmission function. However, mobile devices according to the related art have a limited camera function. Consequently, mobile devices according to the related art do not satisfy the user's needs. For example, as one of the sub-functions of the camera function according to the related art, a video-recording function includes allowing the user to only start and stop recording a video. Therefore, the user using a mobile device according to the related art cannot execute another function during the activation of the video-recording function. In addition, if users newly set their desired camera function to the mobile devices, unexpected problems are created, such as application conflicts between the camera function and the other functions. Therefore, a system is required that can add new functions or set functions in mobile devices, according to the users' request, without application conflicts or function failures.

Therefore, a need exists for an apparatus and method for executing functions of systems installed to a mobile device in a variety of modes.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a function expanding method for executing functions of systems installed to a mobile device in a variety of modes, and a mobile device adapted to the method.

Another aspect of the present invention is to provide a function expanding method for flexibly adding new functions to a mobile device, without conflicting functions of systems installed to the mobile device, and smoothly and rapidly processing commands. The present invention further provides a mobile device adapted to the method.

In accordance with an aspect of the present invention, an expanded function supporting method is provided. The method includes receiving input signals for activating a user function related to a system installed to a mobile device, establishing a basic function supporting path used to operate the system when the user function is activated, and an expanded function supporting path to operate an expanded function of the system when an input signal for operating the expanded function is received, and transferring, when receiving an input signal for operating the expanded function, a command for operating the expanded function via the expanded function supporting path.

In accordance with another aspect of the present invention, a mobile device for supporting function expansion is provided. The device includes a system for supporting a user function, a storage unit for storing a module related to a basic function supporting path established when the system is activated and for storing modules related to an expanded function supporting path established to operate an expanded function of the system, at least one of an input unit and a touch screen that respectively create input signals for operating the system, and a controller for operating the module related to a basic function supporting path or the modules related to an expanded function supporting path, according to the input signal.

In accordance with another aspect of the present invention, a method of supporting an expanded function is provided. The method includes receiving an input signal for executing at least one of a user function of a mobile device and an expanded function of a mobile device, and transmitting a command corresponding to the input signal to one of a plurality of function supporting paths based on whether the input signal corresponds to an input signal for executing a user function of the mobile device or to an input signal for executing the expanded function of the mobile device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms or words used in the following description and claims are not limited to the bibliographical meaning, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, although the exemplary embodiments will be explained, based on a camera as the system installed to the mobile device and the camera function, it should be understood that the present invention is not limited to the exemplary embodiments. For example, the system may be at least one sensor for detecting the state of the mobile device, a microphone for receiving audio sound, a broadcast receiving module for receiving and processing broadcasts, etc. Therefore, the function expanding method can also be applied to the functions of the systems listed above as well as the camera function.

Figure 1:
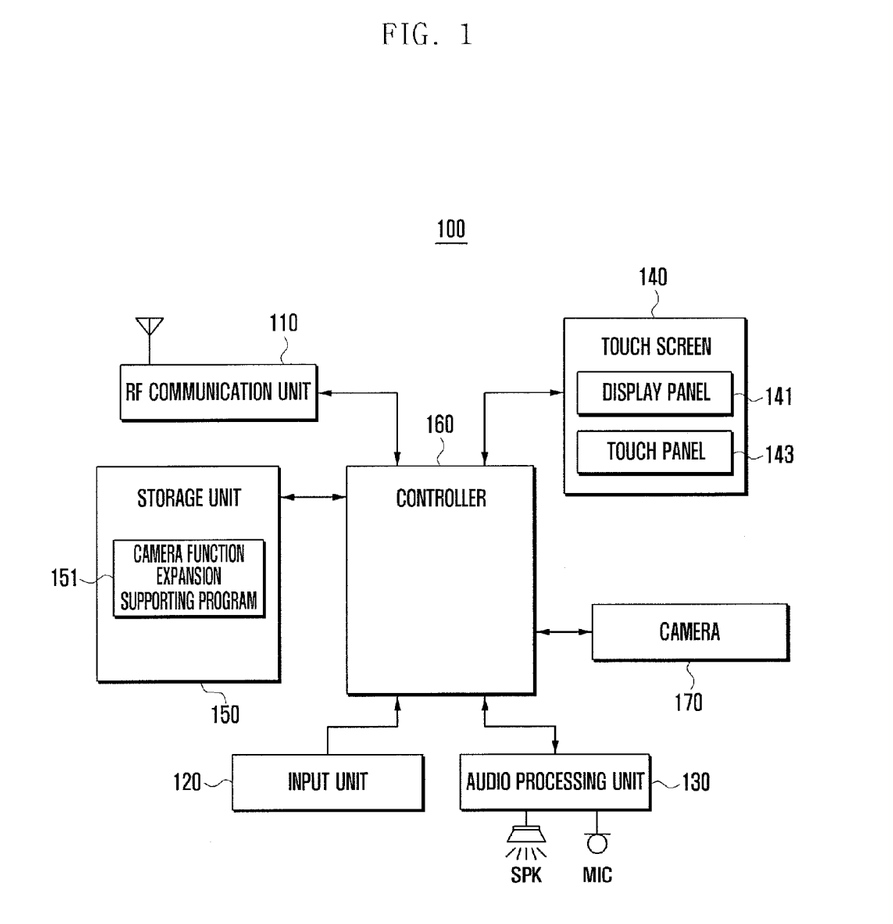
FIG. 1 illustrates a schematic block diagram of a mobile device according to an exemplary embodiment of the present invention.

FIG. 1 illustrates a schematic block diagram of a mobile device according to an exemplary embodiment of the present invention.

Referring to FIG. 1, the mobile device 100 includes an RF communication unit 110, an input unit 120, an audio processing unit 130, a touch screen 140, a storage unit 150, a controller 160, and a camera 170.

In order to expand the functions of the camera 170, the mobile device 100 provides a basic Application Programming Interface (API) for supporting a basic function of the camera 170, and function-expansion API for supporting an expanded function of the camera 170. Therefore, the mobile device 100 can provide a variety of expanded camera functions according to a user's requested, without conflicting with the basic function and without causing side effects. According to exemplary embodiments of the present invention, the mobile device 100 is designed in such a way that expanded camera functions according to the user's request are defined based on a function-expansion API, and a data transfer path is defined so that data for operating expanded functions is directly transferred from the function-expansion API to a function control module. According to exemplary embodiments of the present invention, the mobile device 100 can operate the camera 170 with a variety of functions, based on the easy function-expansion and simple operation. For example, the mobile device 100 reserves paths for supporting the basic function and expanded functions of the camera 170 respectively, and provides the path for supporting expanded functions according to the request, thereby transferring data required to operate the expanded functions via the path.

The RF communication unit 110 establishes communication channels for making a voice/video call, for transmitting data, such as video data, text messages, and the like, under the control of the controller 160. The RF communication unit 110 establishes a voice/video call channel, and a data communication channel, with an external mobile communication system. As an example, the RF communication unit 110 includes an RF transmitter for up-converting the frequency of signals to be transmitted and amplifying the signals and an RF receiver for low-noise amplifying received RF signals and down-converting the frequency of the received RF signals. In an exemplary embodiment of the present invention, the RF communication unit 110 transmits information regarding images acquired via the camera 170 to external mobile devices according to the user's request. Alternatively, the RF communication unit 110 can receive information regarding images from an external mobile device via the established communication channel. The RF communication unit 110 can also receive function block data for expanding functions of the camera 170 from the external systems, and transfers it to the controller 160. It should be understood that the mobile device 100 may not be equipped with the RF communication unit 110 if it is configured to provide the RF communication function.

The input unit 120 includes input keys and function keys that allow the user to input numbers or letter information and to set a variety of functions. The function keys include direction keys, side keys, shortcut keys, and the like, which are set to perform specific functions. In addition, the input unit 120 creates key signals (e.g., input signals) for setting user's options and for controlling functions of the mobile device 100. The input unit 120 transfers the key signals to the controller 160. If the mobile device 100 is equipped with a touch screen 140, the touch screen 140 displays a QWERTY key map, a DVORAK key map, a 3×4 key map, a 4×3 key map, or the like, serving as the input unit 120. The input unit 120 may be implemented with a control key map for controlling the camera 170 during the operation of the camera 170. The input unit 120 creates input signals for driving the camera 170, for activating an image capture function or a video-recording function, for pausing or resuming the video-recording operation, and the like, according to the user's request. In addition, the input unit 120 can also create input signals for auto-focusing on a particular point in a preview image, for transferring an image to a particular mobile device during the video-recording operation, for turning on/off an audio receiving function during the video-recording operation, and the like, according to the user's request. The input unit 120 transfers the created input signals to the controller 160. The controller 160 uses the received input signals as commands to expand the functions of the camera 170.

The audio processing unit 130 includes a Speaker (SPK) for reproducing audio data that is transmitted during the call, included in messages, or created when audio files are played back. The audio processing unit 130 also includes a Microphone (MIC) for receiving a user's voice during the call or audio signals. The audio processing unit 130 outputs sound effects or guide voices related to the operations of the functions of the camera 170. When function keys related to the function expansion are operated, the audio processing unit 130 can output sound effects or guide voices corresponding to the keys. Exemplary embodiments of the present invention may be implemented in such a way that the audio data according to the function key related to the camera function expansion may not be output according to the user's settings.

The touch screen 140 includes a display panel 141 and a touch panel 143, where the touch panel 143 is installed to the front of the display panel 141.

The display panel 141 displays menus of the mobile device 100, and information input by the user or information provided to the user. The display panel 141 provides various types of screens according to the operations of the mobile device 100, such as an idle screen, menu screens, a message writing screen, a call screen, and the like. The display unit 141 may be implemented with a Liquid Crystal Display (LCD), an Organic Light Emitting Diode (OLED), or the like. The display panel 141 is placed on the upper or lower side of the touch panel 143.

In an exemplary embodiment of the present invention, the display panel 141 displays various types of screens related to the operations of the camera 170. For example, the display panel 141 displays a preview screen for acquiring a still image while operating the functions of the camera 170, a screen for showing images, acquired from a subject in a preview mode, or at a particular time point according to an input signal, a screen for storing or deleting the acquired image, etc. The display panel 141 also displays a preview screen for acquiring a video while operating the functions of the camera 170, a screen for recording a video according to an input signal, a menu screen for showing a number of items for executing storage, deletion, transmission, or process of the acquired video, and the like. The recording screen includes a key map with a number of function keys for supporting a variety of expanded functions: for example, a key for pausing the output of a recorded video, a key for resuming the paused video, a key for transmitting images during the video-recording operation, a key for controlling the functions related to the acquisition of audio signals during the video-recording operation, and the like.

When an event occurs by touching a particular location on a screen of the touch panel 143 during the video-recording operation, the display panel 141 displays an automatic focused screen with respect to the touched location, and the currently recorded video screen.

The touch panel 143 is placed in the upper and/or lower side of the display panel 141 and includes touch sensors arrayed in a matrix form. The touch panel 143 creates a signal when an event by a user's finger touch occurs, via the sensors, and transfers it to the controller 160. That is, the touch panel 143 transfers information regarding a location where the touch event has occurred and the type of touch event to the controller 160. The touch panel 143 can create signals corresponding to touch events via the function key maps and allow for the touches at any positions in order to support an automatic focus function. The touches applied to the touch panel 143 are converted to command data corresponding to the function key map allocated to the locations and then transferred to the controller 160. In order to support an automatic focus function, the touch panel 143 transfers command data for corresponding functions and location information regarding the touches to the controller 160.

The storage unit 150 stores application programs for executing functions according to exemplary embodiments of the present invention, and various types of key maps or menu map for operating the touch screen 140. The storage unit 150 includes a program storage area and a data storage area.

The program storage area stores an Operating System (OS) for booting the mobile device 100 and for controlling the entire operation of the components in the mobile device 100. The program storage area also stores application programs for supporting user functions, for example, a file reproducing function, a call function, a web-browser function, an audio playback function (e.g., MP3 files), an image output function for searching and displaying photographs, a video playback function, and the like. In an exemplary embodiment of the present invention, the program storage area stores a camera function-expansion supporting program 151.

The camera function-expansion supporting program 151 includes routines for supporting a basic function and expanded functions of the camera 170. The basic function supporting routine is loaded on the memory when the mobile device 100 is booted, and supports functions according to an input signal for activating the camera 170 under the control of the controller 160. When an input signal for executing an expanded function (e.g., a video-recording function), during the operation of the camera 170, is created, the expanded function supporting routine is loaded on the memory from the storage unit 150, and then the expanded function is executed under the control of the controller 160. As an example, the camera function-expansion supporting program 151 is loaded on the memory only if a corresponding expanded function is requested, thereby efficiently managing the memory. In addition, the expanded function supporting routine further includes a number of sub-routines for: a pausing function during the video-recording operation; a resuming function of a paused video-recording operation; an audio controlling function during the video-recording operation; a data transmission function during the video-recording operation; and the like. The expanded function supporting routine is implemented with function modules, which will be explained, in detail, with the description of the controller 160.

The data storage area stores data generated when the mobile device 100 is used, for example, a phone book, contents, at least one icon according to the widget function, and the like. The data storage area also stores user's input via the touch panel 143. The data storage area temporarily stores a video that has been currently recorded according to the operation of an expanded function of the camera 170. For example, when a pausing function of the camera 170 is activated during the video-recording operation the video recorded by the time point is temporarily stored in the data storage area. When the video resuming function is activated, the video after the resumption is stored, following the previously paused video, in the data storage area.

The controller 160 initializes the components in the mobile device 100 by supplying electric power thereto. The controller 160 also controls the signal flow in order to support the expanded functions of the mobile device 100. To this end, the controller 160 may include the components as shown in FIG. 2.

Figure 2:
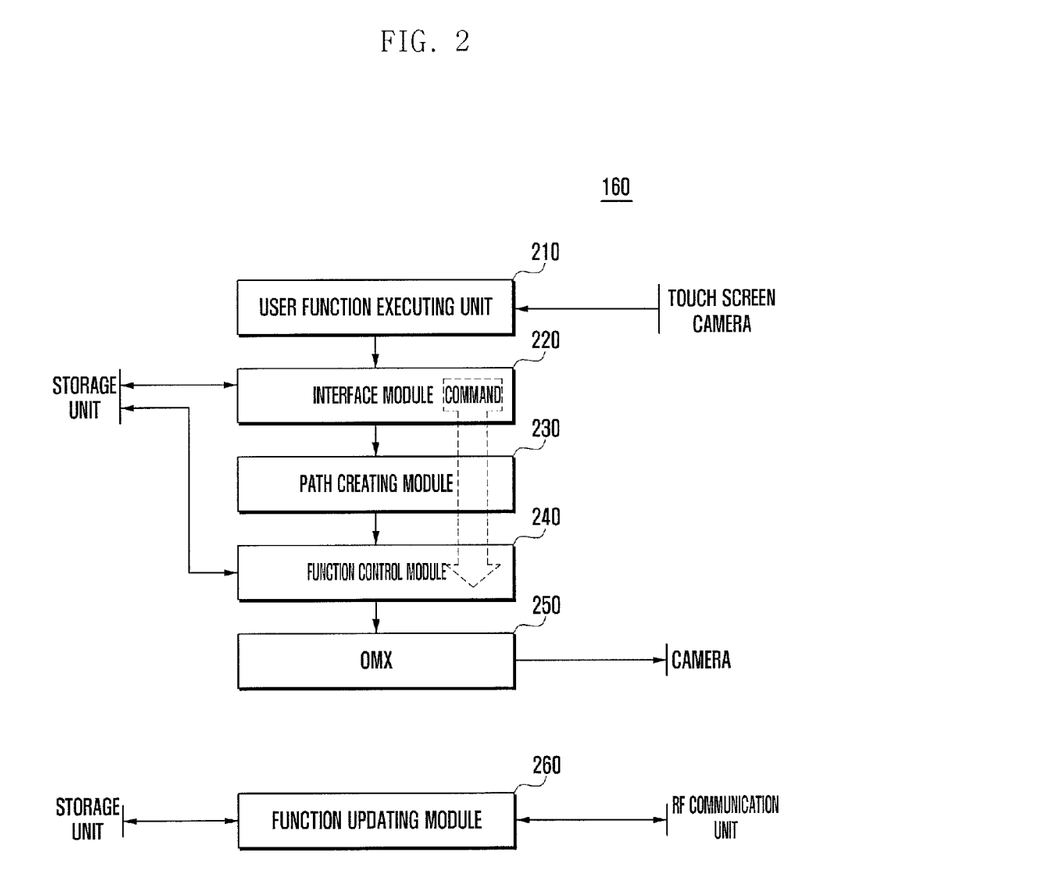
FIG. 2 illustrates a schematic block diagram of a controller according to an exemplary embodiment of the present invention such as, for example, the controller shown in FIG. 1.

FIG. 2 illustrates a schematic block diagram of a controller according to an exemplary embodiment of the present invention such as, for example, the controller 160 shown in FIG. 1.

Referring to FIG. 2, the controller 160 includes a user function executing unit 210, an interface module 220, a path creating module 230, a function control module 240, and an OMX 250. The controller 160 may further include a function updating module 260. When a user function is selected according to a signal created via the input unit 120 or the touch screen 140, the user function executing unit 210 executes the application corresponding thereto. The application is loaded on the memory and supports the user function under the control of the user function executing unit 210. For example, if the user selects a menu or a widget for activating the camera 170, the user function executing unit 210 loads the application for supporting the functions of the camera 170 on the memory and supports the functions. The user function executing unit 210 outputs a preview video, input via the camera 170, on the touch screen 140, and captures an image/images when a shutter key input signal is created. The user function executing unit 210 also controls the settings of the camera 170 to support a variety of functions. Alternatively, when a user function is selected via the sensors, the user function executing unit 210 can also call the application to support the function.

In order to support the basic function of the camera 170, according to exemplary embodiments of the present invention, the controller 160 may be designed in such a way that: the interface module 220 is placed under the user function executing unit 210; the path creating module 230 is placed under the interface module 220; the function control module 240 is placed under the path creating module 230; and the OMX 250 is placed under the function control module 240. Therefore, when the user function executing unit 210 transfers a command for operating a function of a component (e.g., the camera 170), to the interface module 220, the interface module 220 coverts the command to a language adapted to the path creating module 230 and then transfers it thereto. The interface module 220 includes basic API for supporting a basic function of a component and function-expansion API for supporting an expanded function of the component. Therefore, if the component is camera 170, the interface module 220 can provide a basic API for supporting the basic function when the camera 170 is executed and also a function-expansion API for supporting the expanded function according to a request for function-expansion.

The path creating module 230 calls a process for supporting a function of the camera 170 from the previously loaded upper process related to the image output of the mobile device 100, and establishes a path for transferring a command for controlling the camera 170 by binding the processes. The upper process supports calls the function control module 240 for operating the function of the camera 170 when binding the processes. When a path is created by binding the processes, the interface module 220 transfers a command for controlling a specific function block to the function control module 240, via the path. The control command may be defined in the interface module 220 to call the function block included in the function control module 240. That is, the interface module 220 may include information that defines the function blocks included in the function control module 240. Although the exemplary embodiment of the present invention is described in such a way that the function blocks refer to blocks for operating the functions of the camera 170, it should be understood that, if a user function is selected via the other components (e.g., sensors), the function blocks may also support the sensor-based functions.

The function control module 240, placed under the path creating module 230, receives a command from the interface module 220 via the module 230 and performs a control operation according to the command. For example, if the function control module 240 receives a video-recording start command, the function control module 240 creates commands for controlling corresponding components required to perform the video-recording operation, and transfers the commands to the OMX 250. Examples of the commands include a command for detecting previously set values for recording a video and adjusting the settings of the camera 170 according to the set values, a command for recording a video, a command for storing videos acquired during the video-recording operation, and the like. Because the function control module 240 includes routines for supporting a basic function of the camera 170, the function control module 240 also creates a command for supporting the basic function and transfers the command the adjacent module.

The function control module 240 can load modules for operating corresponding expanded functions and execute the expanded functions via the modules. The expanded functions may be implemented with corresponding function blocks, where the respective function blocks are defined in the interface module 220. According to exemplary embodiments of the present invention, the interface module 220 transfers commands for executing only the defined function blocks to the function control module 240 via the path creating module 230. The function control module 240 identifies function blocks corresponding to the received commands and executes the expanded functions via the blocks. When new functions related to the camera 170 are implemented in the mobile device 100, the function modules corresponding to the function are arrayed in the function control module 240, and defined in the interface module 220, thereby easily expanding the functions of the camera 170.

The OMX 250 converts the commands from the function control module 240 in terms of their types to operate the modules and transfers them to the modules. The OMX 250 receives commands for controlling the camera 170, created in the function control module 240, and transfers the commands to the modules of the camera 170, thereby controlling the camera 170. Therefore, the function control module 240 can control the functions of the camera 170 corresponding to the user's requests, via the OMX 250.

The function updating module 260 supports the function-expansion of the camera 170. If the mobile device 100 receives updating information regarding the camera 170 or is equipped with new function blocks to include new functions of the mobile device 100 or to update the previous functions, the function updating module 260 receives update information and information regarding corresponding function blocks via the RF communication unit 110 from the external system. The RF communication unit 110 establishes a channel for receiving update information and information regarding the function blocks, and may be implemented with various types of interfaces in wired/wireless mode. When the function updating module 260 receives information regarding function blocks and/or update information, the function updating module 260 arranges the information at a certain location of a corresponding function control module 240 and describes the definition regarding the added function blocks in the interface module 220. When the mobile device 100 is equipped with new functions related to the camera 170, the mobile device 100 defines the new functions in the function control module 240 and the interface module 220 respectively. Therefore, according to exemplary embodiments of the present invention, the mobile device 100 can allow the user to use the added new functions. Alternatively, the function blocks related to the camera 170 may not be defined when the function blocks are updated or may be newly defined to comply with update information according to the mobile device manufacturer's design.

Figure 3:
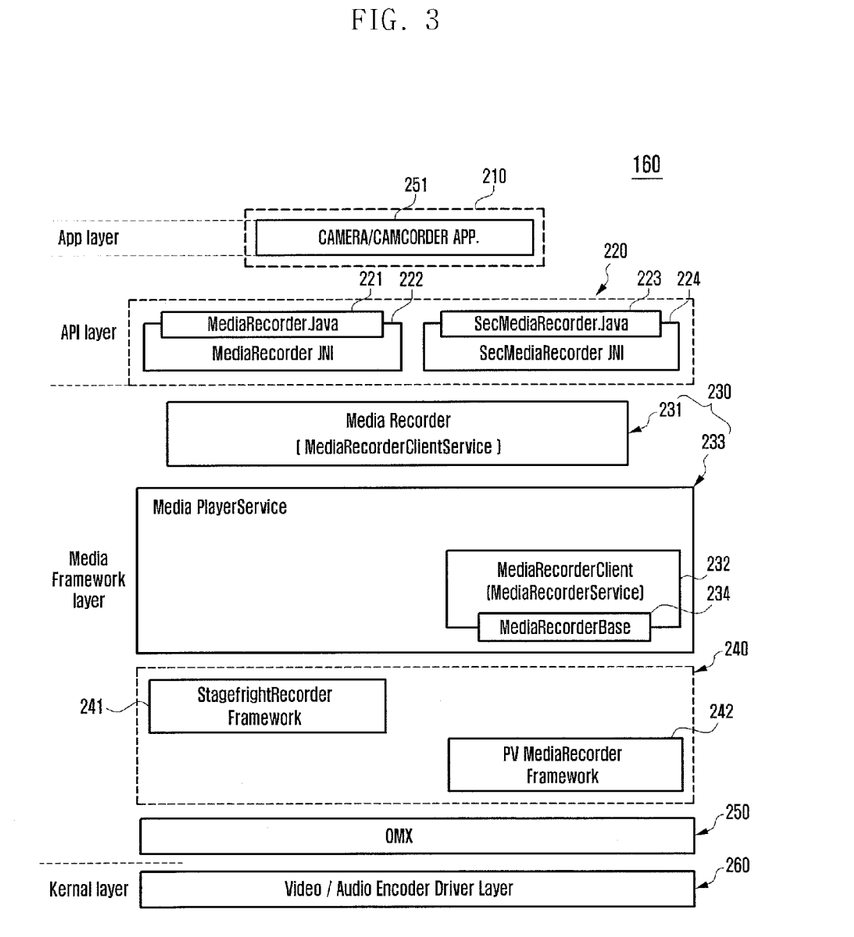
FIG. 3 illustrates a detailed view of a controller according to an exemplary embodiments of the present invention such as, for example, the controller shown in FIG. 1.

FIG. 3 illustrates a detailed view of a controller according to an exemplary embodiment of the present invention such as, for example, the controller shown in FIG. 1.

Referring to FIG. 3, the controller is equipped with modules for supporting the functions of the camera 170. The modules are arrayed in the controller 160 to operate the camera 170 based on the Android framework. It should be understood that exemplary embodiments of the present invention are not limited to the operation of the camera 170 based on the Android framework, but may be adaptively applied to a variety of frameworks to expand the functions of the camera 170.

With further reference to FIG. 3, the controller 160 is designed in such a way that a camera/camcorder application 251, as a user function executing unit 210, is arrayed on an application layer, and an interface module 220 is arrayed an API layer to transfer commands, created in the camera/camcorder 251, to the lower modules. The interface module 220 includes MediaRecorder.java 221 for supporting the basic function of the camera 170 and MediaRecorder JNI 222 for converting language of the MediaRecorder.java 221. This configuration enables the camera/camcorder application 251 to operate in Java. This is because the lower modules are operated in computer language C or C++.

When a video-recording function with an expanded function of the camera 170 is operated, the interface module 220 includes SecMediaRecorder JNI 224 and SecMediaRecorder.java 223 arrayed in the memory used for executing functions. The SecMediaRecorder JNI 224 and SecMediaRecorder.java 223 refer to modules newly defined to support the expanded functions of the camera 170. According to exemplary embodiments of the present invention, the SecMediaRecorder JNI 224 and SecMediaRecorder.java 223 are not loaded on the memory if the expanded function of the camera 170 is not executed. According to exemplary embodiments of the present invention, the SecMediaRecorder JNI 224 and SecMediaRecorder.java 223 are loaded on the memory, according to an input signal for operating a corresponding expanded function, and perform an interfacing operation to support the expanded function.

MediaPlayerService 233 corresponding to the path creating module 230 located on the Media Framework layer is loaded during the booting process of the mobile device 100 and supports the mobile device 100 outputting the various images. MediaPlayerService 233 creates MediaRecorder 231 according to the request of the interface module 220, and MediaRecorderClient 232 to support the functions of the camera 170, according to the request of the interface module 220. During this process, MediaRecorder 231 and MediaRecorderClient 232 are bound with each other, and transfer commands from the interface module 220 to the lower function control module 240 via the bounded path. MediaRecorderClient 232 processes the header of command data transferred from the interface module 220 based on MediaRecorderBase 234.

StagefrightRecorder Framework 241 and PVMediaRecorder Framework 242, corresponding to the function control module 240, refer to modules that directly execute the functions of the camera 170. The modules 241 and 242 may be variously implemented according to the types of cameras installed to the mobile device 100. Although the embodiment shown in FIG. 3 is implemented with two modules 241 and 242, it may be modified to include one module according to the mobile device manufacturer's design. Although the controller 160 includes two modules 241 and 242, the interface module 220 can set a path so that it cooperates with one of them and operates the functions of the camera 170. For example, MediaRecorder.java 221 establishes a path with StagefrightRecorder Framework 241 and operates the functions of the camera 170 based on the established module. Alternatively, SecMediaRecorder.java 223 establishes a path with StagefrightRecorder Framework 241 or PVMediaRecorder Framework 242, and transfers commands required to operate the functions of the camera 170 based on the established module.

The function control module 240 converts the commands, transferred via the path creating module 230 bound with the interface module 220, into corresponding commands required to operate the camera 170. The function control module 240 is equipped with function blocks corresponding to expanded functions, selects one of the blocks according to a command transferred from the interface module 220, and creates a command to execute a function of the camera 170, related to the selected function block.

The OMX 250 converts the commands transferred from the function control module 240 into commands in a format that can be detected by a Video/Audio Encoder Driver Layer 260 corresponding to a Kernel Layer. The OMX 250 transfers a corresponding converted command to the Video/Audio Encoder Driver Layer 260. The Video/Audio Encoder Driver Layer 260 includes CODECs and signals lines connected to the camera 170. The Video/Audio Encoder Driver Layer 260 receives commands for controlling the camera 170 from the upper layer and transfers the commands to the components in the camera 170. The Video/Audio Encoder Driver Layer 260 transfers information regarding a video acquired by the camera 170 to the function control module 240 via the OMX 250. For example, when a video-recording operation is executed, the Video/Audio Encoder Driver Layer 260 transfers the information indicating that a video is being acquired or has been acquired to the function control module 240. The Video/Audio Encoder Driver Layer 260 also performs a data transferring operation so that the acquired video is stored in the storage unit 150 or temporarily stored in the memory, according to a command transferred from the function control module 240. The Video/Audio Encoder Driver Layer 260 encodes the video acquired by the camera 170 in a certain mode and stores the encoded data in the storage unit 150.

Figure 4:
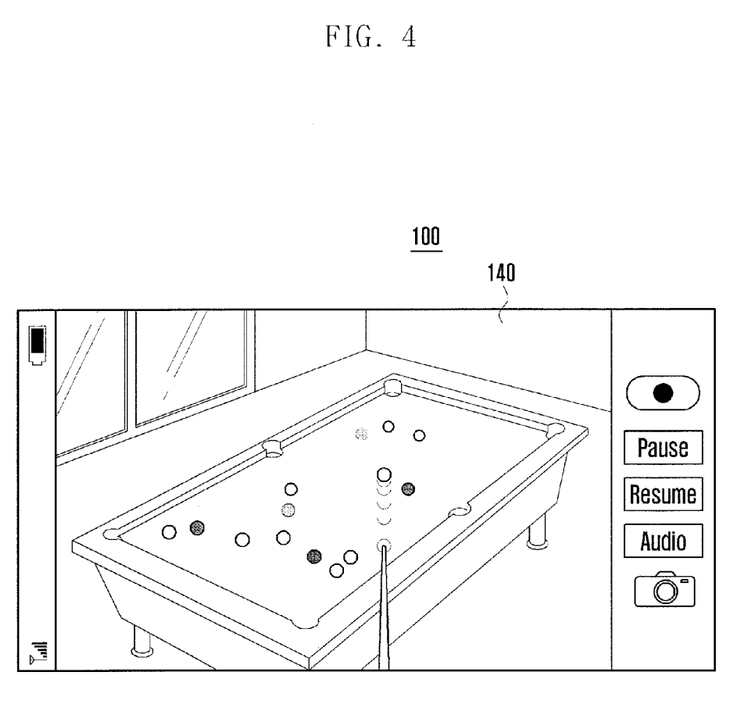
FIG. 4 illustrates a screen showing a user interface according to an exemplary embodiment of the present invention.

FIG. 4 illustrates a screen showing a user interface of the mobile device 100 according to an exemplary embodiment of the present invention.

Referring to FIG. 4, when the mobile device 100 activates the camera 170 according to a user's request, the mobile device 100 shows a preview screen of a video, acquired via the lens of the camera 170, on the touch screen 140. During this process, the mobile device 100 executes the user function executing unit 210 to operate the camera 170.

When the user creates an input signal to activate an expanded function of the camera functions (e.g., a video-recording function), the mobile device 100 loads an API for supporting the expanded function on the interface module 220 and establishes a path for supporting the expanded function. After that, the mobile device 100 calls the function control module 240 for supporting an expanded function. For example, the mobile device 100 establishes paths for supporting a basic function and expanded functions, respectively.

When the mobile device 100 calls the function control module 240 and identifies the function blocks therein, the mobile device 100 displays items corresponding to the respective function blocks at one side on the screen For example, the mobile device 100 may display a 'Pause' for pausing a function operation, a 'Resume' for resuming a video-recording operation, an 'Audio' for controlling audio, and the like. In that case, the user can select one of the items, for example, related to a video-recording operation. In addition, if the camera 170 supports the expanded functions, the controller 160 displays items linked thereto on the touch screen 140. When one of the items linked to the expanded functions is selected, the controller 160 calls the interface module 220, the path creating module 230 and the function control module 240, in order to support the selected expanded function.

For example, when the user selects an item 'Pause,' the touch screen 140 transfers a command corresponding to the item to the user function executing unit 210. The user function executing unit 210 transfers the command to the interface module 220. The interface module 220 creates a command corresponding to the item 'Pause' and transfers the command to the function control module 240 via a path creating module 230 bound therewith. The function control module 240 calls the 'Pause' function block via the received command, and creates commands for controlling the camera via the function block.

The user interface module 220 transfers command data including a number of parameters to the function control module 240 in order to operate the function blocks. When the user touches a certain point on the touch screen 140 during the video-recording operation, the touch screen 140 transfers the touched location information and a command corresponding to a function (e.g., an automatic focusing function), to the user function executing unit 210. After receiving the information, the user interface module 220 creates location information regarding the touched point and command data corresponding to an automatic focusing function, and transfers them to the function control module 240. The function control module 240 selects a function block to execute the automatic focusing function, creates a command for executing the function with respected to the received location information and transfers the command to the camera 170.

The mobile device 100 can control a variety of functions of the camera 170. When the mobile device 100 executes an expanded function, the mobile device 100 can call the interface module 220 separated from the basic function, create a command required to control the functions of the camera 170, based on the module 220, and transfer the command to the camera 170. Therefore, the mobile device 100 can support the expanded functions of the camera 170, without conflicting with the basic function or causing unexpected events.

In the foregoing description, the configuration and operations of the mobile device 100 related to the function expansion of the camera 170 were explained, with the user interface.

Figure 5:
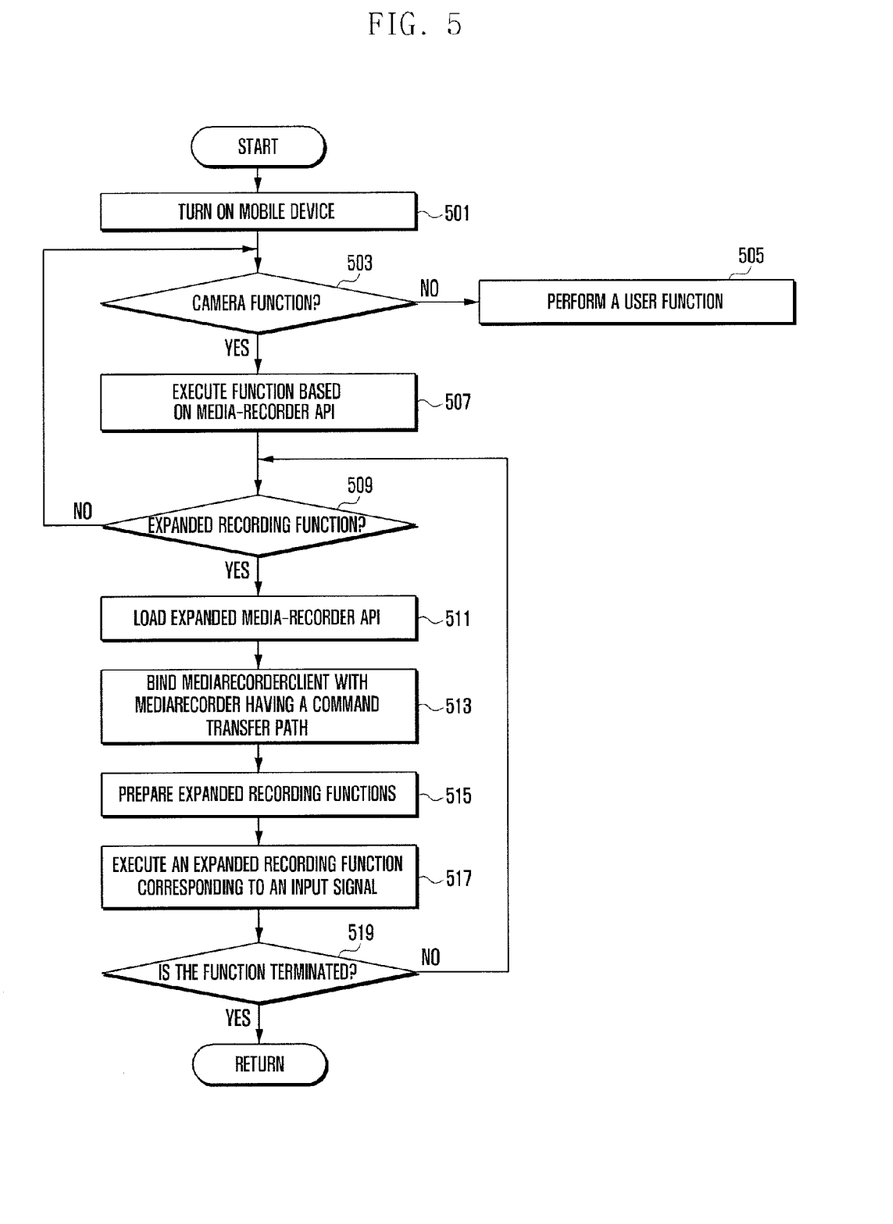
FIG. 5 illustrates a flow chart that describes a function expanding method according to an exemplary embodiment of the present invention.

FIG. 5 illustrates a flow chart that describes a function expanding method according to an exemplary embodiment of the present invention.

Referring to FIG. 5, when the mobile device 100 is turned on, the controller 160 controls the supply of electric power to the components at step 501. The controller 160 receives an input signal and determines whether the input signal corresponds to a signal for operating a function of the camera 170 at step 503. When the controller 160 determines that the input signal does not correspond to a signal for operating a function of the camera 170 at step 503, the controller 160 performs a user function corresponding to the input signal at step 505 (e.g., a voice call function, a file search function, a file playback function, an web accessing function, and the like), according to the functions of the mobile device 100. If the user intends to add expanded functions related to the camera 170 to the mobile device 100, the controller 160 establishes, via the RF communication unit 110, a communication channel with a server that provides data of the function blocks corresponding to the expanded functions, and then receives the function block data. The received function block data is transferred to and defined in the interface module 220 and the function control module 240.

In contrast, when the controller 160 determines that the input signal corresponds to a signal for operating a function of the camera 170 at step 503, the controller 160 supports the functions of the camera 170 based on a basic media recorder API for supporting the basic function of the camera 170 at step 507. For example, the controller 160; calls an application for operating the camera 170 based on the user function executing unit 210; binds MediaRecorder.java, MediaRecorder JNI, and MediaRecorder with MediaRecorderClient in order to process commands according to the execution of a corresponding application; calls the function control module 240; and the like. The controller 160 establishes a basic function supporting path via modules for supporting the basic function of the camera 170. After that, the controller 160 supports the basic function of the camera 170 according to the signals for controlling the camera 170 input via the touch screen 140, and the like. The basic functions of the camera 170 may be various according to the type of camera installed to the mobile device 100, for example, a still image acquiring function, and the like.

After operating the basic function of the camera 170 at step 507, the controller 160 determines whether a signal is created to activate an expanded function (e.g., an expanded video-recording function) at step 509. The expanded video-recording function may be set to the mobile device 100 by default. Alternatively, an option may be set to the mobile device 100 to select one of the previous video-recording function and the expanded video-recording function. To this end, the mobile device 100 may display, on the touch screen 140, an option item for selecting one of a still image acquiring function, a basic video-recording function, or an expanded video-recording function. When the controller 160 determines that a signal is not created to activate an expanded video-recording function at step 509, the controller returns to and proceeds with step 503.

In contrast, when the controller 160 determines that a signal is created to activate an expanded video-recording function at step 509, the controller 160 loads an expanded media recorder API at step 511. The controller 160 calls the interface module 220 for supporting the expanded functions of the camera 170. After that, the controller 160 binds MediaRecorderclient with MediaRecorder having a command transfer path at step 513. For example, the controller 160 performs an operation to establish a path for transferring commands of the interface module 220. During the process, a MediaPlayerService module, related to the image processes in the mobile device 100, calls processes for setting a path according to the request of the interface module 220 and binds the processes with each other.

The MediaPlayerService module calls the function control module 240 to support an expanded recording function linked to the established path at step 515. The function control module 240 may have been called to support the basic function of the camera 170 or may additionally call function blocks corresponding to the expanded functions. In order to efficiently manage the memory, it is preferable that corresponding function blocks may be called each time that the expanded camera functions are requested; however, it may be designed in such a way that the blocks are stored in the memory when supporting the basic function and activated when a corresponding expanded function is used. As such, the controller 160 can establish expanded function supporting paths via the expanded function supporting modules.

After preparing for the support of an expanded recording function at step 515, the controller 160 executes the function according to an input signal at step 517. After that, the controller 160 determines whether a signal is input to terminate operating the expanded function at step 519. If the controller 160 determines that a signal is input to terminate operating the expanded function at step 519, the controller 160 returns to step 501. In contrast, if the controller 160 determines that a signal is not input to terminate operating the expanded function at step 519, the controller 160 returns to and proceeds with step 509.

As described above, the function expansion supporting method according to exemplary embodiments of the present invention is performed in such a way that: a path for supporting a basic function of a system, installed to the mobile device and selected to perform a user function, is established via the modules for supporting the basic function; and a path for supporting the expanded functions is established via the modules for supporting the expanded functions; and a command, created to support an expanded function, is transferred via the expanded function supporting path. Therefore, in order to expand the functions of a system installed to the mobile device (e.g., a camera), and operate the expanded functions as well as the basic function, the function expansion supporting method according to exemplary embodiments of the present invention can provide the flexible function expansion, with the minimal affects to the components in the mobile device. In addition, the method according to exemplary embodiments of the present invention can use corresponding data only when supporting an expanded function, thereby increasing the use efficiency of memory.

Although the exemplary embodiment of the present invention was explained in such a way that the still image acquiring function is defined as a basic function of the camera 170, it should be understood that exemplary embodiments of the present invention is not limited to such exemplary embodiments. That is, the still image acquiring function may serve as an expanded function according to the mobile device manufacturers' design. In that case, a block for supporting the still image acquiring function may be arrayed in the function control module 240, and the definition for designating the block may also be made in the interface module 220. Although the function expansion supporting method and the mobile device adapted thereto are explained based on the camera 170 and the specific functions for example, it should be understood that they can also be applied to the example where the expanded functions are added to the basic function of the camera.

As described above, the function expanding method, according to exemplary embodiments of the present invention, can add functions of new systems to a mobile device, without conflicting functions of systems that have been installed to the mobile device, and efficiently and rapidly process commands for executing the functions of the systems. Therefore, the mobile device adapted to the method provides use convenience to the user.

Although it is not shown in the drawings, the mobile device may selectively further include various types of components, for example: a short-range communication module for short-range communication; an interface for transmitting/receiving data in a wireless or weird mode; an Internet communication module; and a digital broadcast module for receiving and reproducing broadcasts. With the spread of digital convergence, although the mobile device is too various to list their modifications in this description, it will be easily appreciated to those skilled in the art that the other components equivalent to the above-listed components may be further included to the mobile device according to exemplary embodiments of the present invention. Also, it will be appreciated that, according to the purposes, the mobile device may be implemented by omitting a particular component or replacing it with other components.

The mobile device according to exemplary embodiments of the present invention includes all information communication devices, multimedia devices, and their applications, which are operated according to communication protocols corresponding to various types of communication systems. For example, the mobile device can be applied to mobile communication terminals, Portable Multimedia Players (PMPs), digital broadcast players, Personal Digital Assistants (PDAs), audio players (e.g., MP3 players), mobile game players, smart phones, laptop computers, hand-held PC, etc.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device configured to support function expansion, the device comprising:
a system configured to support a user function;
a storage unit configured to store a module related to a basic function supporting path established when the system is activated and to store modules related to an expanded function supporting path established to operate an expanded function of the system;
at least one of an input unit and a touch screen each configured to create input signals for operating the system; and
a controller configured to operate at least one of the module related to the basic function supporting path and the modules related to the expanded function supporting path according to the input signal, and to control, after the system is activated, to create the expanded function supporting path in response to an input signal for operating the expanded function while the system-related user function for the basic function is active,
wherein the touch screen is configured to display a user interface to support the basic function of the mobile device and a user interface to support the expanded function, and to display items for selecting the expanded function.

2. The mobile device of claim 1, wherein the controller comprises:
a user function executing unit configured to operate an application related to the user function supported by the system;
an interface module configured to convert the format of commands created in the user function executing unit;
a path executing module configured to create the path to transfer the converted commands;
a function control module configured to receive the converted commands and to create at least one command to control the user function supported by the system; and
a media acceleration interface configured to transfer the created command to the system.

3. The mobile device of claim 2, wherein the interface module comprises:
an Application Programming Interface (API) configured to support the basic function; and
an Application Programming Interface (API) configured to support the expanded function.

4. The mobile device of claim 3, wherein the controller is further configured to loads the expanded function supporting API.

5. The mobile device of claim 3, wherein the path executing module is further configured to create a path for supporting the API that supports the basic function when the system-related user function is activated and to create a path for supporting the API that supports the expanded function when an input signal is created to support the expanded function.

6. The mobile device of claim 3, wherein the function control module comprises:
function blocks corresponding to the expanded function.

7. The mobile device of claim 6, wherein the interface module comprises:
information regarding the definition of commands for controlling the function blocks.

8. The mobile device of claim 7, wherein the controller further comprises:
a function update module configured to add function blocks or updating the function blocks.

9. The mobile device of claim 8, further comprising:
an RF communication unit configured to receive information regarding the addition or update of the function blocks.

10. The mobile device of claim 9, wherein:
the function updating module is configured to define, when receiving a block for adding function blocks, the added function blocks in the interface module; and
the added function blocks are arrayed in the function control module.

11. The mobile device of claim 1, wherein the system comprises a camera.

12. The mobile device of claim 1, wherein the basic function supporting path and the expanded function supporting path are formed based on mobile framework.

13. An expanded function supporting method, the method comprising:
receiving input signals for activating a user function related to a system installed to a mobile device;
establishing a basic function supporting path used to operate the system when the user function is activated;
displaying, while the system-related user function for the basic function is active, items corresponding to the expanded function on a user interface corresponding to the user function in response to receiving an input signal for operating the expanded function;
creating an expanded function supporting path to operate the expanded function of the system; and
transferring, when receiving an input signal for selecting one of the displayed items, a command for operating the expanded function via the expanded function supporting path.

14. The method of claim 13, wherein the creating the expanded function supporting path comprises:
loading, when receiving an input signal for operating the expanded function while the system-related user function is executed, an Application Programming Interface (API) for supporting the expanded function on an interface module;
establishing a path for supporting the API that supports the expanded function; and
calling a function control module including function blocks corresponding to the expanded function.

15. The method of claim 14, wherein the interface module comprises:
information regarding the definition of commands for controlling the function blocks.

16. The method of claim 14, further comprising:
adding function blocks or updating the function blocks.

17. The method of claim 16, further comprising:
establishing a communication channel for receiving information regarding the addition or update of the function blocks.

18. The method of claim 17, further comprising:
defining, when receiving a block for adding function blocks, the added function blocks in the interface module; and
arraying the added function blocks in the function control module.

19. The method of claim 13, further comprising:
displaying the user interface including items for selecting the expanded function of the system-related user function.

20. The method of claim 13, wherein:
the system comprises a camera; and
establishing the paths based on mobile framework.

* * * * *